United States Patent
Dierks, Jr. et al.

(10) Patent No.: US 7,376,763 B2
(45) Date of Patent: May 20, 2008

(54) METHOD FOR TRANSFERRING DATA FROM A MEMORY SUBSYSTEM TO A NETWORK ADAPTER BY EXTENDING DATA LENGTHS TO IMPROVE THE MEMORY SUBSYSTEM AND PCI BUS EFFICIENCY

(75) Inventors: Herman Dietrich Dierks, Jr., Round Rock, TX (US); Binh K. Hua, Austin, TX (US); Sivarama K. Kodukula, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/621,948

(22) Filed: Jul. 17, 2003

(65) Prior Publication Data

US 2005/0015549 A1    Jan. 20, 2005

(51) Int. Cl.
*G06F 13/28* (2006.01)
(52) U.S. Cl. .............................. 710/34; 710/33; 710/35; 710/62; 710/65
(58) Field of Classification Search .................... 710/3, 710/5, 6, 7, 33; 711/1, 100, 200; 712/405
See application file for complete search history.

(56) References Cited

U.S. PATENT DOCUMENTS

| | | | | |
|---|---|---|---|---|
| 6,055,580 A | * | 4/2000 | Chen et al. ..................... 710/5 |
| 6,141,705 A | * | 10/2000 | Anand et al. .................. 710/15 |
| 6,456,283 B1 | * | 9/2002 | Ishida ......................... 345/421 |
| 6,625,806 B1 | * | 9/2003 | Ono et al. .................... 717/136 |
| 6,633,832 B1 | * | 10/2003 | Browen ....................... 702/186 |
| 6,820,186 B2 | * | 11/2004 | Webber et al. .............. 711/219 |
| 2002/0095554 A1 | * | 7/2002 | McCrory et al. ........... 711/144 |

OTHER PUBLICATIONS

Dierks, Jr. et al., Method and Apparatus for Transferring Data from a Memory Subsystem to a Network Adapter for Improving the Memory Subsystem and PCI Bus Efficiency.

* cited by examiner

*Primary Examiner*—Ilwoo Park
(74) *Attorney, Agent, or Firm*—Duke W. Yee; Diana R. Gerhardt; Cathrine K. Kinslow

(57) ABSTRACT

A method, apparatus, and computer instructions for transferring data from a memory to a network adapter in a data processing system. The frame size for a transfer of the data from the memory to the network adapter is identified. If the frame size is divisible by a cache line size without a remainder, a valid data length is set equal to the length field. However, if the frame size divided by the cache line size results in a remainder, the length field is set to align the data with the cache line size. The data transfer is then initiated using these fields.

4 Claims, 4 Drawing Sheets

| PCI COMMAND | NUMBER OF BYTES TRANSFERRED | CUMULATIVE TOTAL | |
|---|---|---|---|
| MRM | 512 | 512 | 502 |
| MRM | 512 | 1024 | 504 |
| MRM | 384 | 1408 | 506 |
| MR | 8 | 1416 | 508 |
| MR | 8 | 1424 | 510 |
| MR | 8 | 1432 | 512 |
| MR | 8 | 1440 | 514 |
| MR | 8 | 1448 | 516 |
| MR | 8 | 1456 | 518 |
| MR | 8 | 1464 | 520 |
| MR | 8 | 1472 | 522 |
| MR | 8 | 1480 | 524 |
| MR | 8 | 1488 | 526 |
| MR | 8 | 1496 | 528 |
| MR | 8 | 1504 | 530 |
| MR | 8 | 1512 | 532 |
| MR | 2 | 1514 | 534 |

*FIG. 5*
*(PRIOR ART)*

| PCI COMMAND | NUMBER OF BYTES TRANSFERRED | CUMULATIVE TOTAL | |
|---|---|---|---|
| MRM | 512 | 512 | 602 |
| MRM | 512 | 1024 | 604 |
| MRM | 512 | 1536 | 606 |

*FIG. 6*

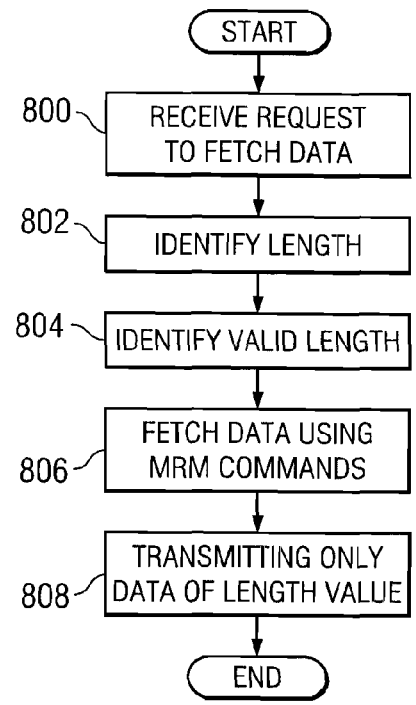
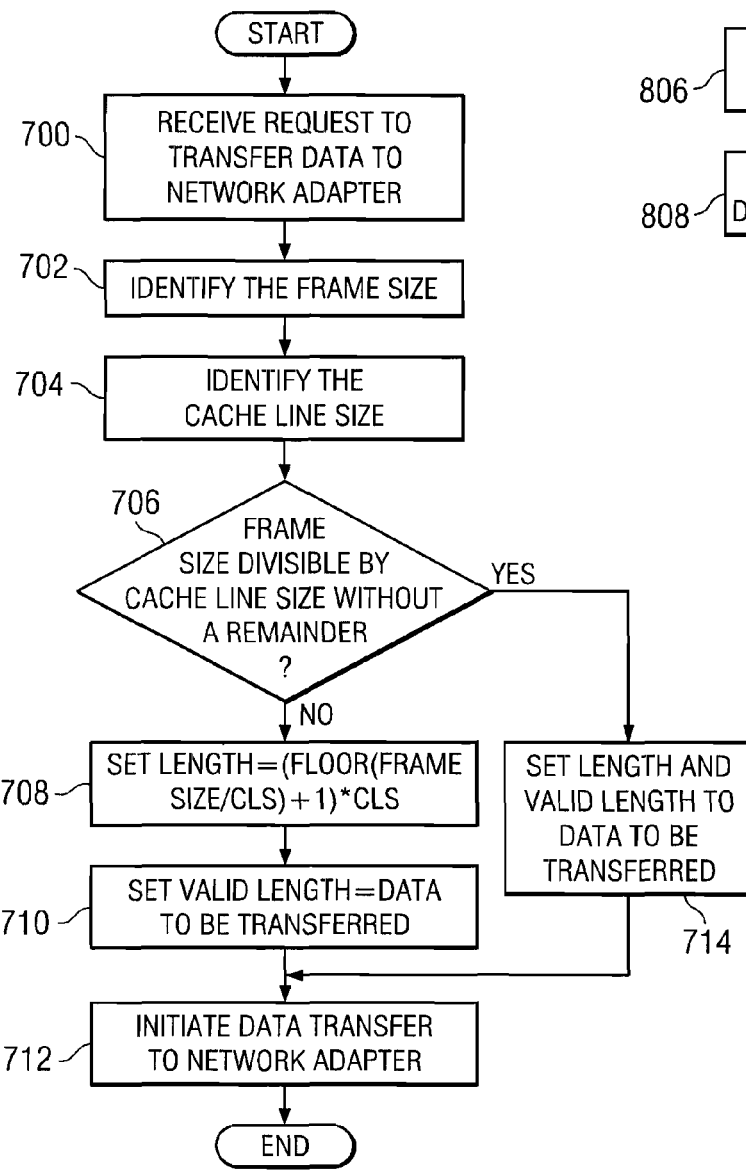
FIG. 8
FIG. 7

METHOD FOR TRANSFERRING DATA FROM A MEMORY SUBSYSTEM TO A NETWORK ADAPTER BY EXTENDING DATA LENGTHS TO IMPROVE THE MEMORY SUBSYSTEM AND PCI BUS EFFICIENCY

CROSS REFERENCE TO RELATED APPLICATIONS

The present invention is related to an application entitled "Method and Apparatus for Transferring Data From a Memory Subsystem to a Network Adapter For Improving the Memory Subsystem and PCI Bus Efficiency", Ser. No. 10/621,931, filed even date hereof, assigned to the same assignee, and incorporated herein by reference.

BACKGROUND OF THE INVENTION

1. Technical Field

The present invention relates generally to an improved data processing system and in particular to a method and apparatus for transferring data. Still more particularly, the present invention relates to a method and apparatus for transferring data from a memory subsystem to a network adapter.

2. Description of Related Art

The data processing systems include a bus architecture for transferring data between various components. One type of bus architecture is a Peripheral Component Interconnect (PCI). PCI provides a high-speed data path between the CPU and peripheral devices, such as memory subsystem, a network adapter, and a video adapter.

With respect to transferring data between a memory subsystem and an input/output (I/O) subsystem using a PCI bus, efficiencies in transferring data are dependent on cache aligned data transfers from the memory subsystem to the I/O subsystem. Efficiencies are greatest when the total data transfer is an integral multiple of the cache line size (CLS). For example, transfers to a disk storage system fit this model in which typical transfers have sizes, such as 512, 1024, 2048, and 4096 bytes.

These efficiencies are typically not found with some I/O subsystems, such as network adapters. For example, a maximum Ethernet frame size is 1514 bytes, which is not divisible by any CLS. A CLS is typically $2^n$ in size. As a result, the remainder of the data is transferred in a small quantity, requiring I/O cycles. This type of overhead becomes significant for high bandwidth network adapters, such as those capable of transferring 10 Gbs.

Therefore, it would be advantageous to have an improved method, apparatus, and computer instructions for transferring data from a memory to a network adapter.

SUMMARY OF THE INVENTION

The present invention provides a method, apparatus, and computer instructions for transferring data from a memory to a network adapter in a data processing system. The frame size for a transfer of the data from the memory to the network adapter is identified. The length is set equal to a cache line size. If the frame size is divisible by a cache line size without a remainder, a valid data length is set equal to the length field. However, if the frame size divided by the cache line size results in a remainder, the length field is set to align the data with the cache line size. The data transfer is then initiated using these fields.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a table of data transfer commands made in transferring data from a memory subsystem to a network adapter using a current transfer process;

FIG. 6 is a diagram of commands used to transfer a frame of data in accordance with a preferred embodiment of the present invention;

FIG. 7 is a flowchart of a process for adjusting the amount of data transferred to maximize transfer efficiency in accordance with a preferred embodiment of the present invention; and FIG. 8 is a flowchart of a process for retrieving data from a memory in accordance with a preferred embodiment of the present invention.

DETAILED DESCRIPTION OF THE PREFERRED EMBODIMENT

Figure 1:
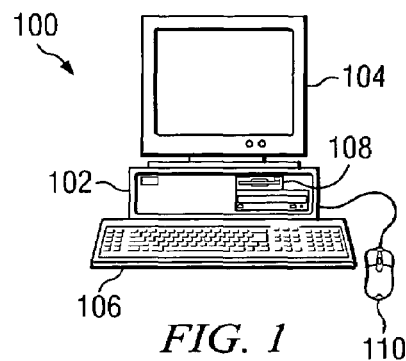
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
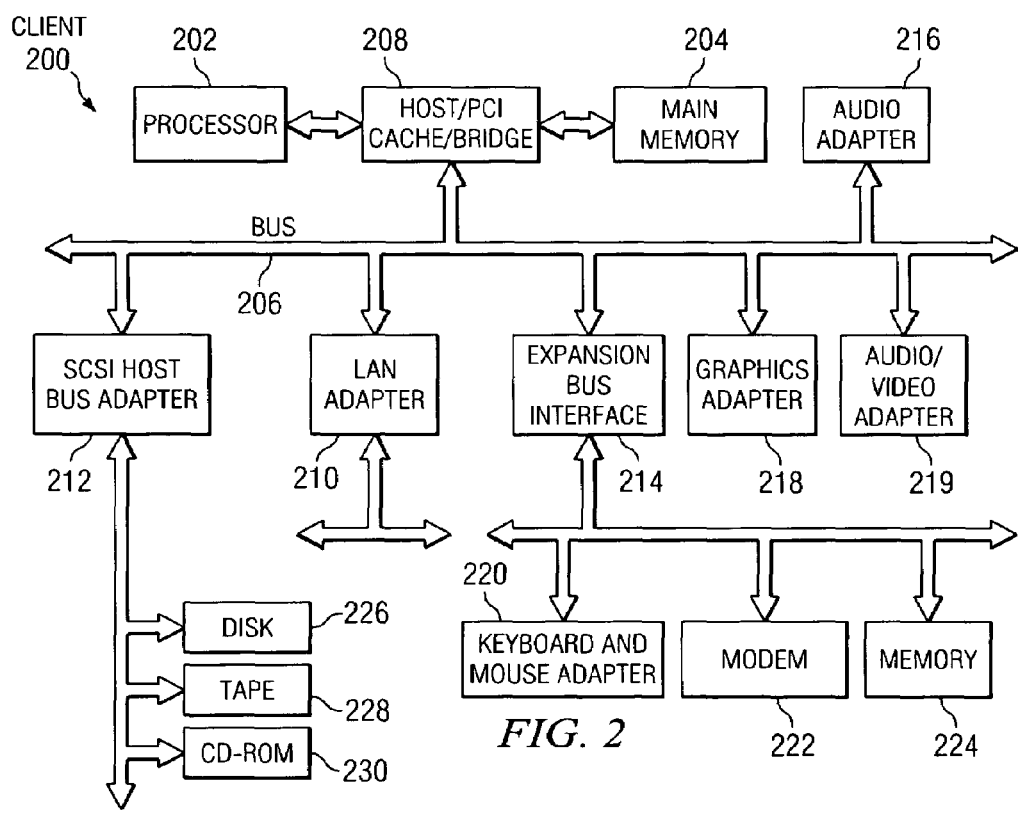
FIG. 2 is a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
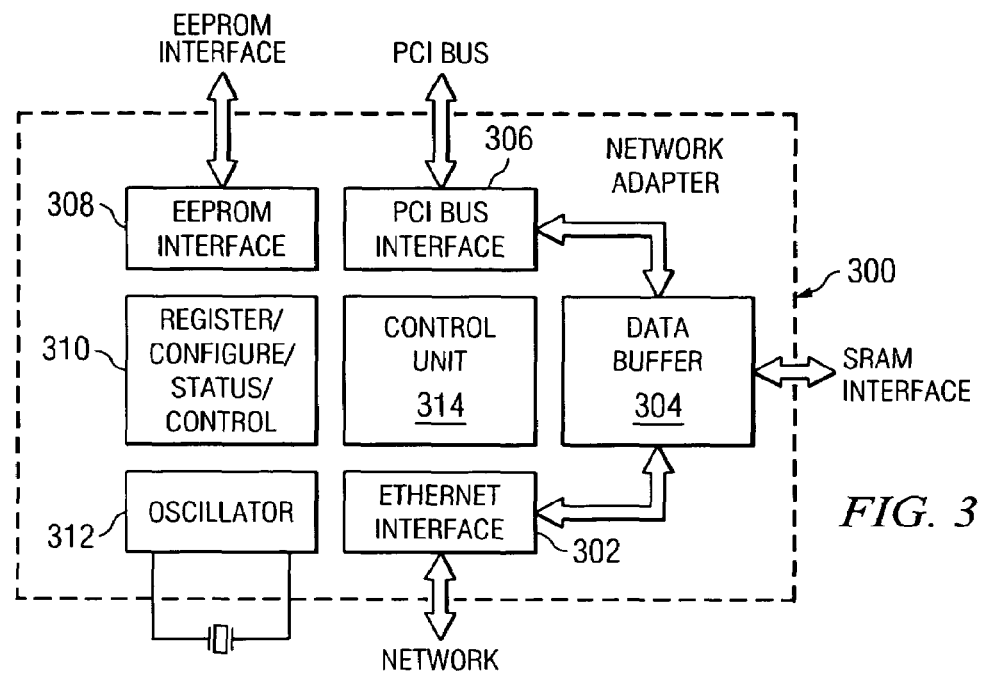
FIG. 3 is a diagram illustrating components used in transferring data from a memory subsystem to a network adapter in accordance with a preferred embodiment of the present invention.

Turning now to FIG. 3, a diagram of a network adapter is depicted in accordance with a preferred embodiment of the present invention. Network adapter 300 may be implemented as LAN adapter 210 in FIG. 2. As shown, network adapter 300 includes Ethernet interface 302, data buffer 304, and PCI bus interface 306. These three components provide a path between the network and the bus of the data processing system. Ethernet interface 302 provides an interface to the network connected to the data processing system. PCI bus interface 306 provides an interface to a bus, such as PCI bus 206 in FIG. 2. Data buffer 304 is used to store data being transmitted and received through network adapter 300. This data buffer also includes a connection to an SRAM interface to provide for additional storage.

Network adapter 300 also includes electrically erasable programmable read-only memory (EEPROM) interface 308, register/configure/status/control unit 310, oscillator 312, and control unit 314. EEPROM interface 308 provides an interface to an EEPROM chip, which may contain instructions and other configuration information for network adapter 300. Different parameters and settings may be stored on an EEPROM chip through EEPROM interface 308. Register/configure/status/control unit 310 provides a place to store information used to configure and run processes on network adapter 300. For example, a timer value for a timer may be stored within these registers. Additionally, status information for different processes also may be stored within this unit. Oscillator 312 provides a clock signal for executing processes on network adapter 300.

Control unit 314 controls the different processes and functions performed by network adapter 300. Control unit 314 may take various forms. For example, control unit 314 may be a processor or an application-specific integrated chip (ASIC).

The present invention provides an improved method, apparatus, and computer instructions for reducing the number of transfers needed to transfer data from a memory to a network adapter. The mechanism of the present invention adjusts the amount of data transferred from the memory to the network adapter such that direct memory access (DMA) reads of data are aligned to a cache line size (CLS). This adjustment is made by adding additional data to the data to be transferred such that the total amount of data is divisible by the CLS without a remainder. In other words, the data is "padded" with additional bytes of data needed to align the data read with the CLS. This added data is ignored by the network adapter when the network adapter outputs the data in an Ethernet frame in these examples. This mechanism includes adding processes executed by a control unit such as control unit 314 in network adapter 300 in FIG. 3.

Figure 4:
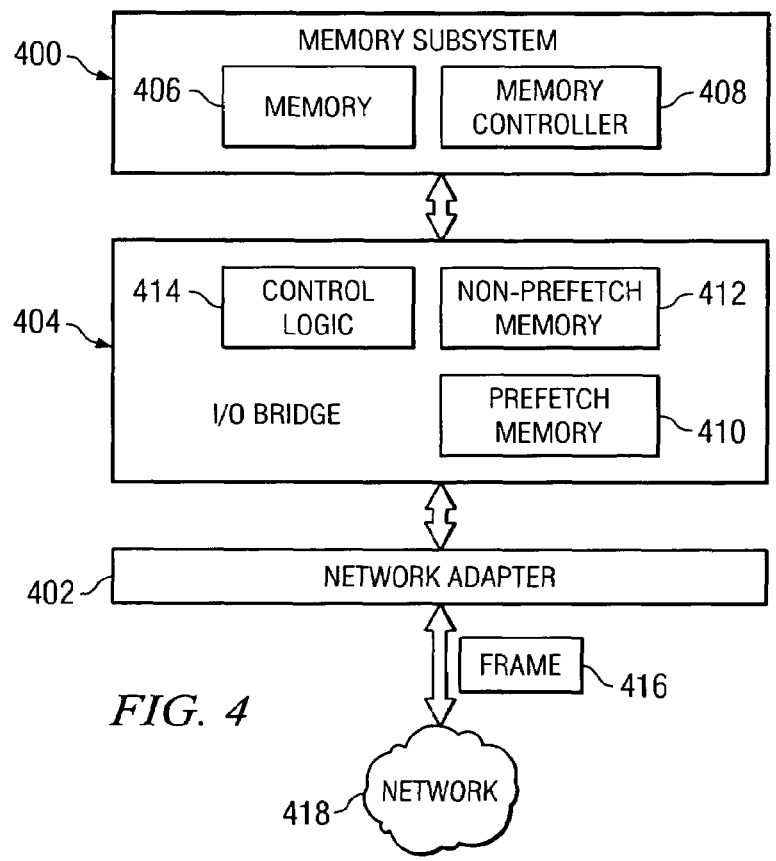

Turning now to FIG. 4, a diagram illustrating components used in transferring data from a memory subsystem to a network adapter is depicted in accordance with a preferred embodiment of the present invention. The components illustrated in FIG. 4 may be implemented in a data processing system, such as data processing system 200 in FIG. 2.

In this example, data is transferred from memory subsystem 400 to network adapter 402 using I/O bridge 404. As illustrated, network adapter 402 may be implemented using network adapter 300 in FIG. 3. Memory subsystem 400 includes memory 406 and memory controller 408. In this example, memory 406 is a system or main memory, such as main memory 204 in FIG. 2. Memory controller 408 may take various forms, such as a processor or an application specific integrated circuit (ASIC). The data to be transferred is located in memory 406. Memory controller 408 is used to control the transfer of data from memory 406 to I/O bridge 404, which may be found in host/PCI/cache bridge 208 in FIG. 2. This I/O bridge interfaces with the processor and the memory on one side, and provides an interface to the PCI bus on the other side.

In this example, I/O bridge 404 includes prefetch memory 410 and non-prefetch memory 412. Access to these memories and the transfer of the data using these memories is handled by control logic 414. Control logic 414 may be implemented in different forms, such as a processor or an ASIC. The present invention provides improved cache aligned memory read operations by extending the amount of data to be transferred system memory, memory 406. The data is extended in system memory in these examples.

More specifically, the mechanism of the present invention adds additional data to the original data if the original data is not cache aligned. The data is cache aligned if the amount of data to be transferred is divisible by the cache line size without a remainder. This additional data may take any form because the additional data is discarded by network adapter 402 after the transfer. Network adapter 402 knows how much data to transfer because a length field is used to indicate how much data is to be fetched by network adapter 402. An additional field, called a valid length field or value indicates how much of that data is to be actually transferred on the network. The length may be equal to or greater than the valid length. Both of these values are sent to network adapter 402 with the data. In these examples, these values are set by the device driver for the networking in adapter and is written in the system memory.

Cache aligned memory read operations occur using prefetch memory 410. Memory read operations that are not cache aligned occur using non-prefetch memory 412. Memory read operations that are not cache aligned occur using non-prefetch memory 312. When a PCI command, MR or MRL is issued, the data is fetched from the system memory, memory 306, into non-prefetch memory 312, whereas if a MRM command is issued, the data is fetched into the prefetch memory 310. These memories are high speed arrays to match with the PCI bus speeds. Typically, non-prefetch memory is a cache line size (128 bytes), and prefetch memory is of multiple cache lines (n*cache line). These examples are implementation specific and can vary from system to system. These memory buffers are located in the I/O bridge.

Network adapter 402 reads data from I/O bridge 404 to generate and send frame 416 onto network 418 in these examples. If the data in memory is cache aligned, the data may be read from prefetch memory 410. The present invention adds additional dummy data to allow for cache alignment. As a result, DMA transfers of data from the system memory to the network adapter may be made more efficiently as described below. Further, this additional data is discarded by the network adapter when data is transferred by the network adapter.

Turning now to FIG. 5, a diagram illustrating a table of data transfer commands made in transferring data from a memory subsystem to a network adapter using a current transfer process is depicted. With a PCI architecture, three classes of memory reads are present. These memory reads are memory read (MR), memory read line (MRL), and memory read multiple (MRM). A MR command is used to read 1 to 8 bytes of data from a non-prefetchable memory in a single PCI cycle, such as one address phase and one data phase. A MRL command is used to read more than a double word up to the next cache line boundary in a prefetchable address space. MRM is a command used to read a block of data, which crosses a cache line boundary of data in a prefetchable address space.

In table 500, a series of commands are illustrated to show how these different types of commands are used in a typical Ethernet frame having a size of 1514 bytes in which this data is fetched by network adapter from system memory. In this example, the CLS is assumed to be 128 bytes. The I/O bridge in this example has a prefetch capability of 512 bytes with a PCI bus having a width of 64 bits (8 bytes).

Entries 502-534 contain commands used to transfer a 1514 byte Ethernet frame from system memory to the network adapter. Entries 502-506 employ MRM commands used to transfer 1408 bytes of data. Entries 508-534 contain MR commands used to transfer the remaining bytes of data needed to form a 1514 byte frame. As can be seen, all of these MR commands waste bandwidth on the system.

Turning next to FIG. 6, a diagram of commands used to transfer a frame of data is depicted in accordance with a preferred embodiment of the present invention. When the number of bytes transferred from the system memory to the network adapter is divisible by the cache line size without a remainder, a smaller number of commands are needed to transfer the data. In this example, the data is cache aligned. The mechanism of the present invention makes this situation possible by adding additional data or "padding" the data such that the data to be transferred to the network adapter is cache aligned. The additional data is added to the end of the actual data that is to be transferred in the depicted example. Depending on the particular implantation, this data may be added in other locations, such as before the data that is to be transferred.

In this example, table 600 includes only three entries, 602, 604, and 606. As illustrated, only MRM commands are used. MR commands are not required in the transfer of this data when the offset is used. As can be seen, in contrast to the number of commands used in table 500 in FIG. 5, a much smaller number of commands are needed to transfer 1536 bytes of data, which includes 1514 bytes plus 22 additional bytes of data.

When this data is received by the network adapter, the network adapter only transmits or outputs a 1514 byte Ethernet frame. The 22 additional bytes of data are discarded. The length value is used to identify the amount of data transferred while the valid length value indicates the amount of data to be transferred. As mentioned above, the length value may be equal to or greater than the valid length value.

Turning next to FIG. 7, a flowchart of a process for adjusting the amount of data transferred to maximize transfer efficiency is depicted in accordance with a preferred embodiment of the present invention. The process illustrated in FIG. 7 may be implemented in components such as memory controller 408 and control logic 414 in FIG. 4.

The process begins by receiving a request to transfer data to a network adapter (step 700). Thereafter, a frame size is identified (step 702), and a CLS is identified (step 704). Next, a determination is made as to whether the frame size is divisible by the CLS without a remainder (step 706).

If the frame size is not divisible by the CLS without a remainder, then a length value is set equal to (FLOOR(frame size/CLS)+1)*CLS (step 708). Step 708 is used to ensure that the amount of data transferred is divisible by the CLS.

Thereafter, the valid length is set equal to the data to be transferred (step 710). The data to be transferred is the same as the frame size in this example. The length set in step 708 is greater than the valid length in this instance. The additional bytes are those used to pad the data that is to be transferred. Next, the transfer of data to the network adapter is initiated (step 712) with the process terminating thereafter.

With reference again to step 706, if the frame size is divisible by the CLS without a remainder, the length and the valid length are set equal to the data that is to be transferred (step 714). In this case, the total amount of data to be transferred is cache aligned. As a result, no padding of the data is needed. The process then proceeds to step 712 as described above.

Turning next to FIG. 8, a flowchart of a process for retrieving data from a memory is depicted in accordance with a preferred embodiment of the present invention. The process illustrated in FIG. 8 may be implemented in a network adapter such as network adapter 300 in FIG. 3. More specifically, these steps may be implemented in instructions executed by control unit 314.

The process begins by a request to fetch data (step 800). Thereafter, a length is identified (step 802), and a valid length is identified (step 804). The data is then fetched using MRM commands (step 806). Only MRM commands are needed in this case because the length value is selected such that the amount of data transferred is cache aligned. Afterwards, data of length value is transmitted (step 808) with the process terminating thereafter.

In this manner, the present invention provides a method, apparatus, and computer instructions for transferring data from a memory to a network adapter. The mechanism of the present invention allows for a significant reduction in the number of commands needed to transfer data to a network adapter across a PCI bus. The mechanism of the present invention achieves the efficiencies by padding the data to be transferred if the data to be transferred is not cache aligned. This additional data is not transmitted by the network adapter. The additional data is identified through values or fields sent to the network adapter along with the data sent to the network adapter for transmission.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transferring data from a memory to a network adapter, the method comprising:

receiving a request to transfer data in the memory to a network adapter;

setting a transfer size to align the data with a cache line size if the amount of data to be transferred is unequal to the cache line size, wherein an amount of data is less than or equal to the transfer size, wherein dummy data is included with the amount of data to be transferred to align the data with the cache line size if the amount of data is less than the transfer size, and wherein the amount of data to be transferred is in a frame and has a frame size;

setting a valid length indicator, wherein the valid length indicator is set to the amount of data and wherein the network adapter outputs only the amount of data set by the valid length indicator after the data has been transferred to the network adapter; and responsive to receiving the request, sending the transfer size and the valid length indicator to the network adapter and transferring to the network adapter an amount of data equal to the transfer size, wherein the network adapter, upon receiving the amount of data equal to the transfer size, identifies the transfer size and the valid length indicator, discards the dummy data based on the transfer size and the valid length indicator, and outputs the amount of data set by the valid length indicator.

2. The method of claim 1, wherein the cache line size is $2^n$, wherein n is a positive integer.

3. The method of claim 1, wherein the data is transferred from the memory to the network adapter through a bridge chip.

4. A method in a data processing system for transferring data from a memory to a network adapter, the method comprising:

identifying frame size for a transfer of the data from the memory to the network adapter;

setting a length equal to a cache line size;

if the frame size is divisible by a cache line size without a remainder, setting a valid data length equal to the length field;

if the frame size divided by the cache line size results in a remainder, setting the length field to align the data with the cache line size, wherein the length field is computed as length field=(FLOOR(frame size/CLS)+1)*CLS, wherein CLS is the cache line size, wherein dummy data is included with the data to align the data with the cache line size; and initiating a transfer of the data from the memory to the network adapter and sending the valid data length and the length field to the network adapter, wherein the network adapter, upon receiving the amount of data equal to the transfer size, identifies the transfer size and the valid length indicator, discards the dummy data based on the transfer size and the valid length indicator, and only outputs data identified by the valid data length.

* * * * *